United States Patent
Whelan

(10) Patent No.: US 8,689,285 B1
(45) Date of Patent: Apr. 1, 2014

(54) RULE-BASED DERIVED-GROUP SECURITY DATA MANAGEMENT

(75) Inventor: John Staehle Whelan, White Bear Lake, MN (US)

(73) Assignee: Siemens Product Lifecycle Management Software Inc., Plano, TX (US)

(*) Notice: Subject to any disclaimer, the term of this patent is extended or adjusted under 35 U.S.C. 154(b) by 0 days.

(21) Appl. No.: 13/616,843

(22) Filed: Sep. 14, 2012

(51) Int. Cl.
*G06F 11/00* (2006.01)

(52) U.S. Cl.
USPC ............... 726/1; 726/2; 713/155; 713/181; 380/247

(58) Field of Classification Search
None
See application file for complete search history.

(56) References Cited

U.S. PATENT DOCUMENTS

| 6,446,206 | B1* | 9/2002 | Feldbaum | 713/175 |
| 2008/0016546 | A1* | 1/2008 | Li et al. | 726/1 |
| 2010/0319051 | A1* | 12/2010 | Bafna et al. | 726/1 |
| 2010/0325686 | A1* | 12/2010 | Davis et al. | 726/1 |

* cited by examiner

*Primary Examiner* — Philip Chea
*Assistant Examiner* — Khoi Le

(57) ABSTRACT

Methods for rule-based group security data management and corresponding systems and computer-readable mediums. A method includes receiving a complex rule set corresponding to at least one electronic document, the complex rule set including a combination of granting rules, denying rules, and rule precedence. The method includes generating derived user groups according to the complex rule set. The method includes deriving grant rules for each electronic document according to the complex rule set to produce a derived grant rule set. The method includes storing the derived grant rules as associated with the electronic document.

14 Claims, 4 Drawing Sheets

RULE-BASED DERIVED-GROUP SECURITY DATA MANAGEMENT

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or "PDM" systems).

BACKGROUND OF THE DISCLOSURE

PDM systems manage PLM and other data. Improved systems are desirable.

SUMMARY OF THE DISCLOSURE

Various disclosed embodiments include methods for rule-based group security data management and corresponding systems and computer-readable mediums. A method includes receiving a complex rule set corresponding to at least one electronic document, the complex rule set including a combination of granting rules, denying rules, and rule precedence. The method includes calculating derived groups from original user groups and a complex rule set. The method includes deriving grant rules for each electronic document according to the complex rule set to produce a derived grant rule set. The method includes storing derived grant rules as associated with the electronic document. This can include storing the derived grant rules in a form that improves the performance and scalability of access checks done as a part of document retrieval.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software, or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
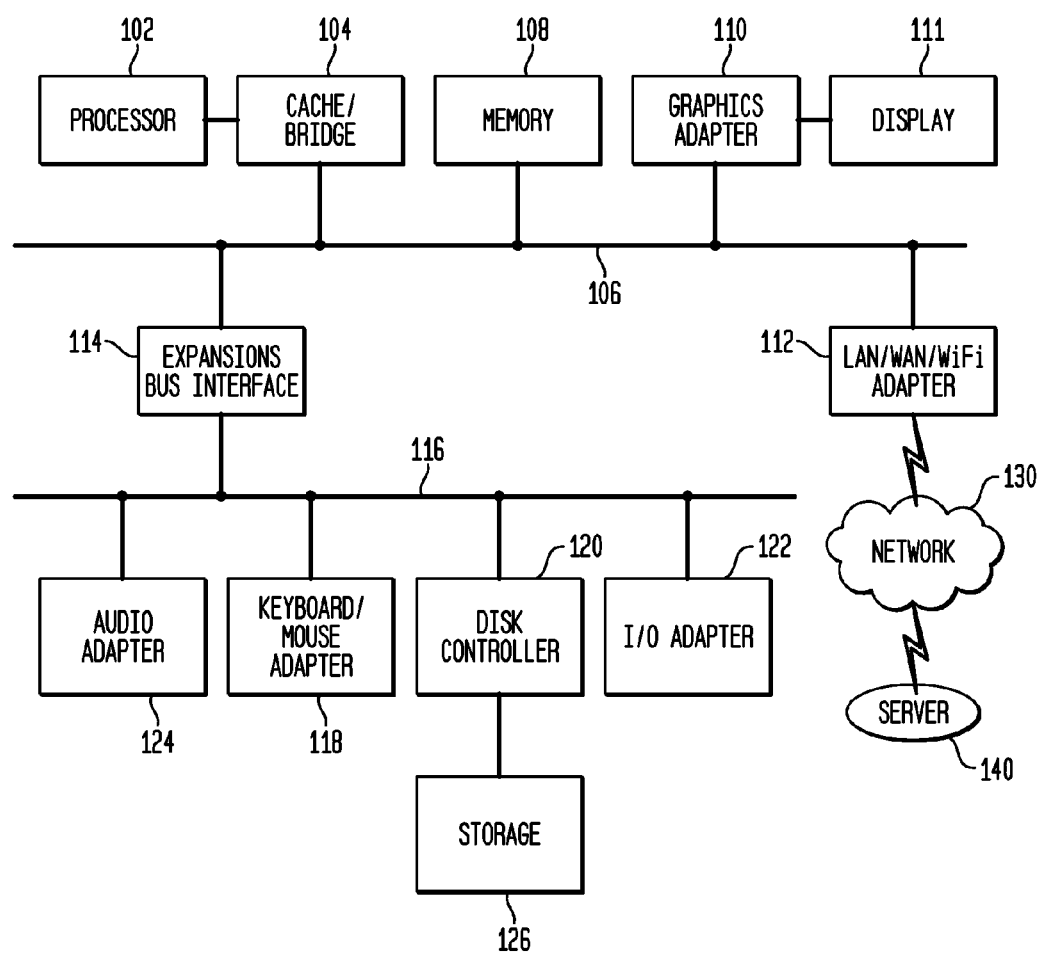
FIG. 1 depicts a block diagram of a data processing system in which an embodiment can be implemented.
Figure 2A:
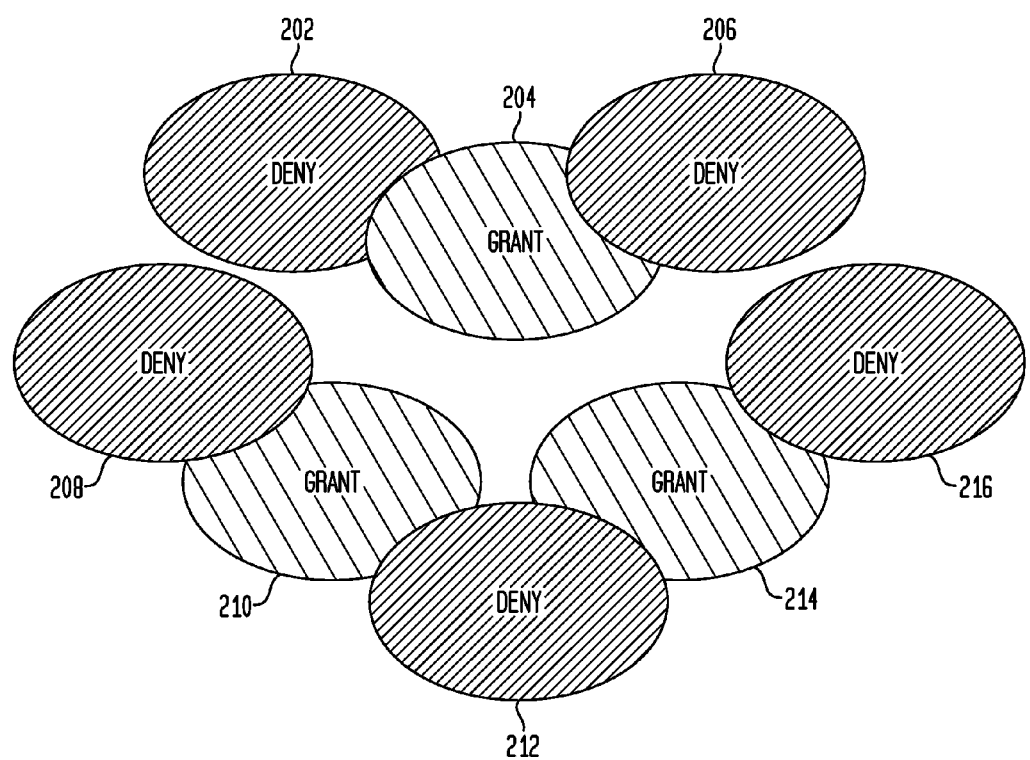
FIGS. 2A and 2B illustrate translation from a system with complex rules, including denying and granting rules with precedence, to a system with only granting rules and no precedence.
Figure 2B:
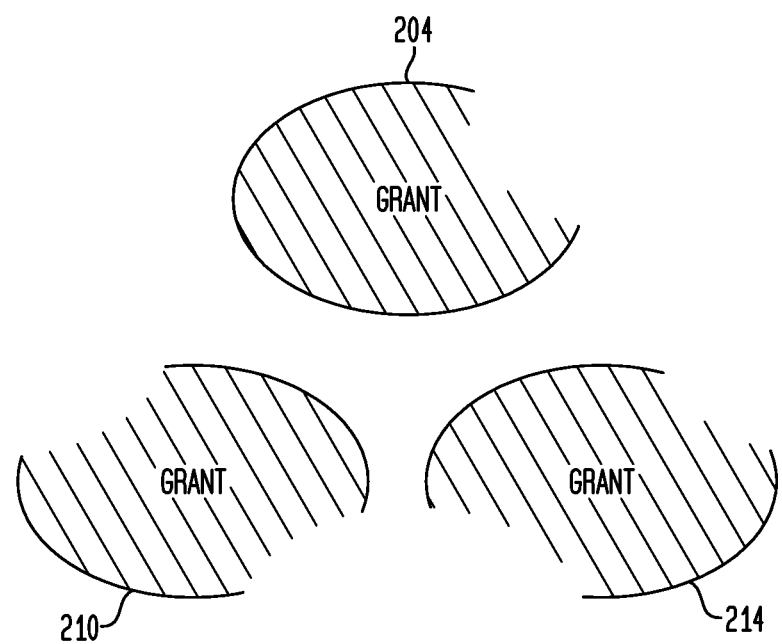
Figure 3:
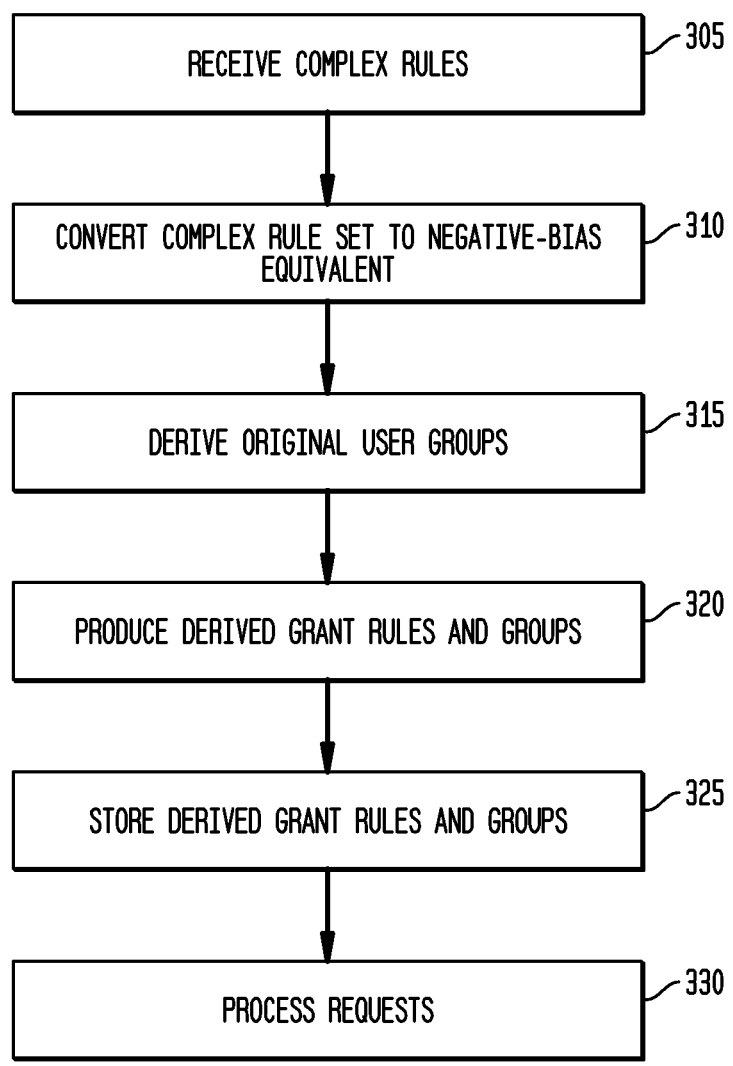
FIG. 3 depicts a flowchart of a process in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Verifying that requesting users have access rights is an important aspect of information management systems, including PDM systems, and can consume significant time and system resources. In the realm of access checking, a system that has simple access rules can have nearly no performance impact due to rules checking because simple granting rules can be implemented via security checks which are included as part of initial queries to databases, a process referred to herein as "Mapped Security", as opposed to post-query filtering.

However, simple access rights that allow for high-performance operations are often at odds with the security needs of enterprise information systems. Many enterprise information systems have an ability to manage highly-complex rules regarding access rights. These systems often contain complex rules for access that can include both granting and denying rules, precedence in rules, and compound rules. Disclosed embodiments replace these complex rules with a form that can obtain the performance characteristics of a system that only contains simple access rights while supporting both mapped security and complex access rights rules.

FIG. 1 depicts a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EE-PROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Derived group mapped security as described herein is a means of translating user access rights which contains complex terms, precedence, granting rules, and denying rules into a set of simple terms containing only grants. By performing this translation, systems gain an ability to map their security credentials into terms that can be included in up-front data selection without the need for post-query filtering. By converting these complex-term rules into terms that include grants only, the time and power needed to retrieve and process the access rules are greatly reduced.

The term "group", as used herein, refers to a set of zero or more users that is associated with access rights to documents.

Starting with a list of access rules, the system analyzes the rules and derives groups for each rule in the list which takes into account the preceding rules that have affected subsets of the groups defined in the latter rules. As an example, assume the following basic rule set:

Rule 1: Allow 'Group V' to read the document.
Rule 2: Disallow 'Group W' to read the document.
Rule 3: Allow people in both 'Group X' AND 'Group Y' in to read the document. (A complex rule.)
Rule 4: Disallow 'Group Z' to read the document.

Note that the exemplary rules listed above are quite simple; in "real" systems, the rules are more complex but still result in a function which results in a Boolean response, and takes as input the details about a user and the details about the document for which access is desired. An example of a rule format is ("access:=f(accessor, document)"), where 'accessor' is a tuple containing user plus other relevant information, such as group, role, project, etc. For purposes of simplicity, detailed processes of determining as to which rules are applicable for a particular document, known to those of skill in the art, are not described here.

In this example, the rules are applied in ascending order. If the principal meets the criteria of rule one, then they are allowed access to the document. If the principal does not meet the criteria for rule one, then the following rules are checked in order until one matches the group memberships of the principal.

The system can identify rules that grant an access right in order to translate and simplify the rules set. In order for queries to identify the granting access right, the system must have a 'negative bias'. If the system has a 'positive bias', so that it defaults to allow access if no rules match, then switching the system to have a negative bias would involve adding an explicit granting rule for 'everyone' as a last rule, and then assuming a negative bias. For example, the following rule set would be generated as a 'negative bias' equivalent of the 'Basic Rule Set' shown above.

Rule 1: Allow 'Group V' to read the document.
Rule 2: Disallow 'Group W' to read the document.
Rule 3: Allow people in both 'Group X' AND 'Group Y' in to read the document.
Rule 4: Disallow 'Group Z' to read the document.
Rule 5: Allow access./*change bias to negative, iff native bias was 'positive'.*/

That is, in this example, a positive-bias system would inherently include a result corresponding to Rule 5, since the positive bias means that access would be granted if no "disallow" rule applied. Rule 5, as a final rule, has no effect in the positive-bias system, but acts to produce a result that is positive-bias equivalent when the system bias is changed to negative.

On each member of the list that grants access, the rule is combined with a negation of the preceding rules that disallow access, and a complex group is generated. By themselves, the negative rules are dropped.

The basic idea is that the rules with lower priority end up matching only the criteria that were not included in higher priority denying rules. As an example, assuming a denying rule for users in group "Q" and a lower-priority rule granting permission for users in group 'R', the resulting grant group is the relative complement of Q with respect to a set R. That is, the grant group includes the set of elements in R but not in Q, which may be shown as "R-Q". If there are multiple preceding denial rules Q, then the resulting derived granting group becomes "R-Q1-Q2- . . . -QN".

Following is a derived grant-group rule set, corresponding to the example above, and in accordance with disclosed embodiments:

Rule 1: ->Allow 'Group A' to read the document. (Where A=V).
Rule 2: ->dropped (negative rule).
Rule 3: ->Allow 'Group B' to read the document. (Where B="(In group X and group Y) AND (not in group W)").
Rule 4: dropped (negative rule).
Rule 5: ->Allow 'Group C' to read the document. (Where C="(Not in group W) AND (not in group Z)").

The process described above for deriving a group rule set from a set of complex access rules is performed at the time which the document is persisted. The derived group memberships with granting privileges are recorded along with the document in the persistence mechanism. While some variation will occur based on the limitations of the persistence mechanism, the recording of the permissions can be implemented, for example, as bit masks in databases or as multi-valued properties in systems such as the Apache Solr system. In some cases, database implementations may choose to resort to using joins to associate derived groups with documents for the mapped security check due to the existence of large numbers of groups that do not translate well into a bit mask; in those implementations, a table containing group names can be used via a join operation.

For each user in the system, the derived group memberships are computed, and made available when attempting access to the data. Augmenting the example above, the following users are included:

Alice: A member of group V.
Bob: A member of groups X and Y.
Charlie: A member of no groups.
Eve: A member of groups W, X, and Y.

These users are processed to show that they have memberships in the following derived groups:

Alice: Member of group 'A' and member of group 'C'.
Bob: Member of group 'B' and member of group 'C'.
Charlie: Member of group 'C'.
Eve: No derived group memberships.

Systems can pre-process the users' derived groups, and store that information.

The derived group membership could then be used to quickly access data. For example, this membership can be added as an ANDed clause to the overall query. Such as:

Secure Query=(Business query) AND (Security Query)
For Alice, this would logically be:
Alice's Secure Query=(Business query) AND (allowAccess=groupA OR allowAccess=groupC')

With this, the system can now make simple queries for Alice that enforce her access rights without requiring highly complex queries or expensive post-query filtering.

FIGS. 2A and 2B illustrate translation from a system with complex rules, including denying and granting rules with precedence, to a system with only granting rules and no precedence. In the diagrams, the rules with higher precedence are on top of (overlay) the ones with lower precedence.

FIG. 2A illustrates a system with precedence and both denial and grant rules. In this figure grant rule 204 has greater precedence than deny rule 202, but less precedence than deny rule 206. Similarly, grant rule 210 has less precedence than deny rule 208 and 212, and grant rule 214 has less precedence than deny rules 212 and 216.

FIG. 2B a logical equivalent where deny rules and precedence have be translated as described herein so that only grant rules remain. Note that in FIG. 2B, there are no longer any "Deny" rules to be considered, and the scope of each of the "Grant" rules 204, 210, and 214 is reduced according to the scope of any of the previous "Deny" rules that had precedence.

FIG. 3 depicts a flowchart of a process in accordance with disclosed embodiments. In this description, the "system" refers to a data processing system including at least one processor and an accessible memory, such as data processing system 100 or other.

The system receives a set of complex access rules (step 305). This complex rule set can include rules that have some combination of granting rules, denying rules, rule precedence, and compound rules. "Receiving", as used herein, can include loading from storage, receiving from another device or process, or otherwise. The complex access rules designate access rights for groups of users to one or more electronic documents, each group having zero or more users (but typically having at least one user and more typically a plurality of users). The electronic documents can be any electronic or digital document, file, media, or otherwise to which access is restricted.

The system can convert the complex rule set to a negative-bias equivalent if the complex access rules are for a positive bias system (step 310). This can include adding a lowest-precedence granting rule to grant access to the electronic document to all users or groups not denied access by higher-precedence rules.

The system generates derived user groups according to the complex rule set (step 315). This step can include analyzing each rule in the complex rule set, and the relative precedence of each rule, to identify original user groups that have the same grant or denial to each electronic document.

The system generates derived grant rules for each document according to the complex rule set to produce a derived grant rule set (step 320). This step includes identifying groups that are granted access to the document, combined with the higher-precedence groups that are denied access. In various embodiments, the derived grant rule set has a derived grant rule for each grant rule in the complex rule set, and does not have derived grant rules for any deny (or deny-only) rule in the complex rule set. Each derived grant rule can include identification of a derived grant group that corresponds to members of the original user groups that are granted access to the electronic document by a grant rule, excluding members of the original user groups that were denied access to the electronic document by a higher-precedence deny rule.

The system stores the derived grant rule and any derived grant group as associated with the respective electronic document (step 325). This can include storing the derived grant rule and derived grant group as properties or attributes of the electronic document itself, storing them in an electronic document index, or otherwise, so that they are accessible when a user requests access to the electronic document.

The system can thereafter respond to access requests for the electronic document from users based on the user, the user's membership in the derived grant group, and the grant rule (step 330).

Of course, those of skill in the art will recognize that, unless specifically indicated or required by the sequence of operations, certain steps in the processes described above may be omitted, performed concurrently or sequentially, or performed in a different order. In particular, the translation process of steps 305-325 can be performed apart from the actual access-lookup process of step 330, which may be performed at a different time or by a different system that has access to the derived grant rule and derived grant group.

System response time is a critical factor for customers. Disclosed embodiments improve system response time to significantly improve response time for a wide variety of actions, while not introducing any limitations in the rules that can be supported. Disclosed embodiments allow existing complex rule sets to coexist with the performance that is seen in typical full text search solutions. This approach can be used in any system containing rules controlled access to data.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for rule-based group security data management, the method performed by a data processing system and comprising:
   receiving, by the data processing system, a complex rule set corresponding to at least one electronic document, the complex rule set including a combination of granting rules, denying rules, and rule precedence;
   generating derived user groups, by the data processing system, according to the complex rule set;
   identifying derived grant groups that correspond to members of original user groups that are granted access to the electronic document by a grant rule of the complex rule set, excluding members of the original user groups that were denied access to the electronic document by a higher-precedence deny rule of the complex rule set;
   deriving grant rules for each electronic document, by the data processing system, according to the complex rule set to produce a derived grant rule set, wherein the derived grant rule set has a derived grant rule for each grant rule in the complex rule set, and does not have derived grant rules for any deny rule in the complex rule set; and
   storing the derived grant rules, by the data processing system, as associated with the electronic document.

2. The method of claim 1, wherein the data processing system also converts the complex rule set to a negative-bias equivalent if the complex rule set is for a positive-bias system.

3. The method of claim 1, wherein the data processing system also responds to access requests for the electronic document from users based on the user, the user's membership in a derived grant group, and the grant rule.

4. The method of claim 1, wherein generating derived user groups includes analyzing each rule in the complex rule set, and a relative precedence of each rule, to identify original user groups that have the same grant or denial to each electronic document.

5. The method of claim 1, wherein each original user group has a plurality of users.

6. A data processing system comprising:
   a hardware processor; and
   an accessible hardware memory, the data processing system particularly configured to
      receive a complex rule set corresponding to at least one electronic document, the complex rule set including a combination of granting rules, denying rules, and rule precedence;
      generate derived user groups according to the complex rule set;
      identify derived grant groups that correspond to members of original user groups that are granted access to the electronic document by a grant rule of the complex rule set, excluding members of the original user groups that were denied access to the electronic document by a higher-precedence deny rule of the complex rule set;
      derive grant rules for each electronic document according to the complex rule set to produce a derived grant rule set, wherein the derived grant rule set has a derived grant rule for each grant rule in the complex rule set, and does not have derived grant rules for any deny rule in the complex rule set; and
      store the derived grant rules as associated with the electronic document.

7. The data processing system of claim 6, wherein the data processing system also converts the complex rule set to a negative-bias equivalent if the complex rule set is for a positive-bias system.

8. The data processing system of claim 6, wherein the data processing system also responds to access requests for the electronic document from users based on the user, the user's membership in a derived grant group, and the grant rule.

9. The data processing system of claim 6, wherein generating derived user groups includes analyzing each rule in the complex rule set, and a relative precedence of each rule, to identify original user groups that have the same grant or denial to each electronic document.

10. The data processing system of claim 6, wherein each original user group has a plurality of users.

11. A non-transitory computer-readable medium encoded with executable instructions that, when executed, cause one or more data processing systems to:
   receive a complex rule set corresponding to at least one electronic document, the complex rule set including a combination of granting rules, denying rules, and rule precedence;

generate derived user groups according to the complex rule set;

identify derived grant groups that correspond to members of original user groups that are granted access to the electronic document by a grant rule of the complex rule set, excluding members of the original user groups that were denied access to the electronic document by a higher-precedence deny rule of the complex rule set;

derive grant rules for each electronic document according to the complex rule set to produce a derived grant rule set, wherein the derived grant rule set has a derived grant rule for each grant rule in the complex rule set, and does not have derived grant rules for any deny rule in the complex rule set; and store the derived grant rules as associated with the electronic document.

12. The computer-readable medium of claim 11, wherein the data processing system also converts the complex rule set to a negative-bias equivalent if the complex rule set is for a positive-bias system.

13. The computer-readable medium of claim 11, wherein the data processing system also responds to access requests for the electronic document from users based on the user, the user's membership in a derived grant group, and the grant rule.

14. The computer-readable medium of claim 11, wherein generating derived user groups includes analyzing each rule in the complex rule set, and a relative precedence of each rule, to identify original user groups that have the same grant or denial to each electronic document.

* * * * *